(12) United States Patent
Ahuja et al.

(10) Patent No.: US 8,244,918 B2
(45) Date of Patent: Aug. 14, 2012

(54) RESOURCE SHARING EXPANSION CARD

(75) Inventors: Manish Ahuja, Pflugerville, TX (US);
Joel H. Schopp, Austin, TX (US);
Michael T. Strosaker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 12/137,204

(22) Filed: Jun. 11, 2008

(65) Prior Publication Data

US 2009/0313390 A1  Dec. 17, 2009

(51) Int. Cl.
*G06F 3/00* (2006.01)
*G06F 13/00* (2006.01)

(52) U.S. Cl. .................. 710/2; 710/8; 710/10; 711/170; 711/173

(58) Field of Classification Search .................. None
See application file for complete search history.

(56) References Cited

U.S. PATENT DOCUMENTS

| | | | |
|---|---|---|---|
| 5,677,831 A | 10/1997 | Lin | |
| 5,857,083 A * | 1/1999 | Venkat | 710/314 |
| 5,898,568 A | 4/1999 | Cheng | |
| 5,930,496 A * | 7/1999 | MacLaren et al. | 703/23 |
| 5,983,357 A * | 11/1999 | Sun | 713/324 |
| 6,104,607 A | 8/2000 | Behl | |
| 6,345,988 B1 | 2/2002 | Ketcham | |
| 6,651,182 B1 * | 11/2003 | Chang et al. | 714/3 |
| 7,447,825 B2 * | 11/2008 | Chen | 710/307 |
| 7,461,274 B2 * | 12/2008 | Merkin | 713/300 |
| 7,512,830 B2 * | 3/2009 | Chu et al. | 714/4.11 |
| 7,555,666 B2 * | 6/2009 | Brundridge et al. | 713/340 |
| 7,584,262 B1 * | 9/2009 | Wang et al. | 709/217 |
| 7,698,487 B2 * | 4/2010 | Rothman et al. | 710/241 |
| 8,099,251 B2 * | 1/2012 | Schipper | 702/108 |
| 2002/0124128 A1 | 9/2002 | Qiu | |
| 2003/0026525 A1 * | 2/2003 | Alvarez | 385/16 |
| 2003/0140267 A1 * | 7/2003 | Abbondanzio et al. | 714/4 |
| 2003/0214781 A1 | 11/2003 | Kolb et al. | |
| 2004/0088414 A1 * | 5/2004 | Flynn et al. | 709/226 |
| 2004/0117536 A1 | 6/2004 | Franke et al. | |
| 2005/0022185 A1 * | 1/2005 | Romero | 718/100 |
| 2005/0038949 A1 * | 2/2005 | Patterson et al. | 710/315 |
| 2005/0055587 A1 | 3/2005 | Lee | |
| 2005/0107123 A1 * | 5/2005 | Ishii et al. | 455/560 |
| 2005/0257213 A1 * | 11/2005 | Chu et al. | 717/170 |
| 2006/0002084 A1 * | 1/2006 | Wei | 361/695 |
| 2006/0015781 A1 * | 1/2006 | Rothman et al. | 714/100 |
| 2006/0027654 A1 * | 2/2006 | Chang et al. | 235/441 |
| 2006/0039120 A1 | 2/2006 | Young | |
| 2006/0094434 A1 * | 5/2006 | Peltola et al. | 455/450 |
| 2006/0129856 A1 * | 6/2006 | Main et al. | 713/320 |
| 2006/0242355 A1 * | 10/2006 | Newman et al. | 711/5 |
| 2006/0271713 A1 * | 11/2006 | Xie et al. | 710/100 |

(Continued)

*Primary Examiner* — Henry Tsai
*Assistant Examiner* — Michael Sun
(74) *Attorney, Agent, or Firm* — Francis Lammes; Stephen J. Walder, Jr.; Steven L. Bennett (57) ABSTRACT

An expansion card is provided that allows resources allocated to the expansion card to be shared with a different card. The expansion card comprises a coupling device that couples the expansion card to a data processing system. The expansion card also includes an identifier data structure that when queried by the data processing system, identifies the expansion card as a resource sharing expansion card. The data processing system reallocates one or more resources allocated to the expansion card to a different card coupled to the data processing system.

15 Claims, 4 Drawing Sheets

U.S. PATENT DOCUMENTS

| | | | |
|---|---|---|---|
| 2007/0022425 A1* | 1/2007 | Jackson | 718/104 |
| 2007/0050644 A1 | 3/2007 | Merkin | |
| 2007/0067435 A1* | 3/2007 | Landis et al. | 709/224 |
| 2007/0083861 A1* | 4/2007 | Becker et al. | 717/174 |
| 2007/0208834 A1* | 9/2007 | Nanamura et al. | 709/220 |
| 2007/0233455 A1* | 10/2007 | Zimmer et al. | 703/27 |
| 2008/0052437 A1 | 2/2008 | Loffink et al. | |
| 2008/0183712 A1* | 7/2008 | Westerinen et al. | 707/9 |
| 2009/0187783 A1* | 7/2009 | Hansen | 713/340 |
| 2009/0193276 A1* | 7/2009 | Shetty et al. | 713/340 |
| 2009/0204736 A1* | 8/2009 | Xie et al. | 710/104 |
| 2009/0307512 A1* | 12/2009 | Munjal et al. | 713/324 |

* cited by examiner

RESOURCE SHARING EXPANSION CARD

BACKGROUND OF THE INVENTION

1. Field of the Invention

The present application relates generally to an expansion card and more specifically to an expansion card that shares its allocated resources with another expansion card.

2. Background of the Invention

Many data processing systems provide for plugging cards into a chassis. Depending on capabilities of the chassis, many different types or versions of cards may be plugged in and operate within the data processing system. However, the chassis may have limitations that prevent some card versions that are capable of being plugged into the chassis from operating, such as power limitation, cooling limitations, or the like. For example, a chassis may allocate a specific number of amps per slot in the chassis. While an earlier version of a card may fit within the slot, the card may exceed the power configuration of the slot by exceeding the specified number of amps of the slot. Therefore, the user may be left to buying a newer version card that can operate within the specification of the chassis. While the earlier version card may be capable of operating in the chassis, limitations such as power, cooling or the like, prevent the use of the earlier version card.

BRIEF SUMMARY OF THE INVENTION

In one illustrative embodiment, an expansion card is provided that allows resources allocated to the expansion card to be shared with a different card. In this illustrative embodiment the expansion card comprises a coupling device that couples the expansion card to a data processing system. The expansion card also includes an identifier data structure that when queried by the data processing system, identifies the expansion card as a resource sharing expansion card. The data processing system reallocates one or more resources allocated to the expansion card to a different card coupled to the data processing system.

In other illustrative embodiments, a method, in a data processing system, is provided for sharing resource allocations between cards. The illustrative embodiments detect an insertion of a card within a chassis. The illustrative embodiments determine if the card meets resource specifications of the chassis. Responsive to the card failing to meet the resource specification of the chassis, the illustrative embodiments determine if there is an unused resource sharing expansion card within the chassis. Responsive to a presence of the unused resource sharing expansion card, the illustrative embodiments reallocate one or more resources from the unused resource sharing expansion card to the card and allow the card to fully boot up.

In another illustrative embodiment, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to, those of ordinary skill in the art in view of the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

As will be appreciated by one skilled in the art, the present invention may be embodied as an apparatus/system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments provide a mechanism that exploits the resource allocations, such as power, cooling, or the like, for one slot in a chassis and shares those resource allocations with an adjacent slot in the chassis. Current chassis specifications allow for various expansion cards. The cards are generally used for extra processors, memory, disks, or the like. The illustrative embodiments provide for an expansion card that may be placed next to an intended use card. The intended use card may be capable of operating with the chassis but may use either too much power or produce too much heat for the version of chassis in which the intended use card is installed. By placing the expansion card within an empty slot adjacent to the intended use card, the intended use card may effectively double its resource allocations.

Firmware within the chassis may determine what kind of intended use card has been plugged into the chassis and refuse to boot the intended use card if the intended use card requires more resource allocation than is allotted by the chassis. That same firmware within the chassis may also detect an expansion card that is installed within the chassis in order that it may share its resource allocations with the intended use card. Additionally, if the intended use card is plugged into the chassis without the expansion card, firmware within the chassis may add text to an error message when the intended card fails to boot because the intended use card requires more than an allotted amount of resources and an expansion card is not present in the chassis. The extra text may provide information that indicates that the intended use card may be used in the chassis if an expansion card is added and the text may also include a part number for the expansion card.

Figure 1:
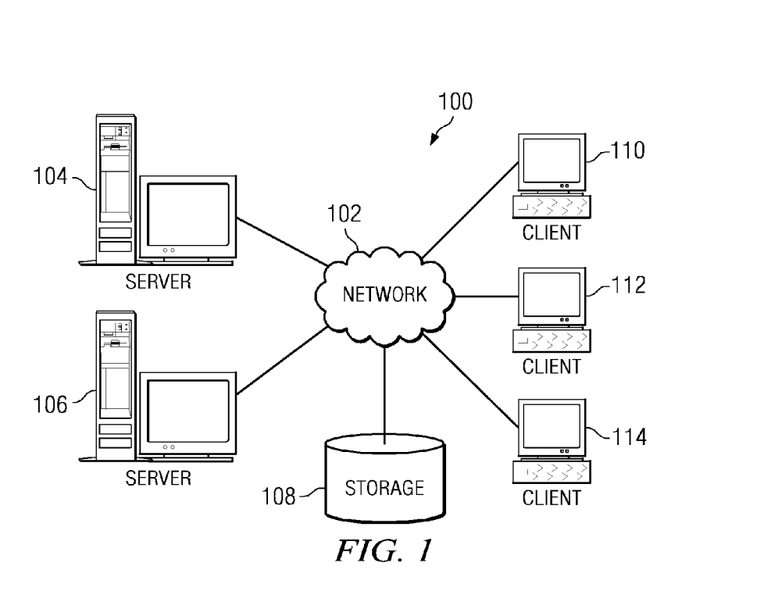
FIG. 1 depicts a pictorial representation of an exemplary distributed data processing system in which aspects of the illustrative embodiments may be implemented.
Figure 2:
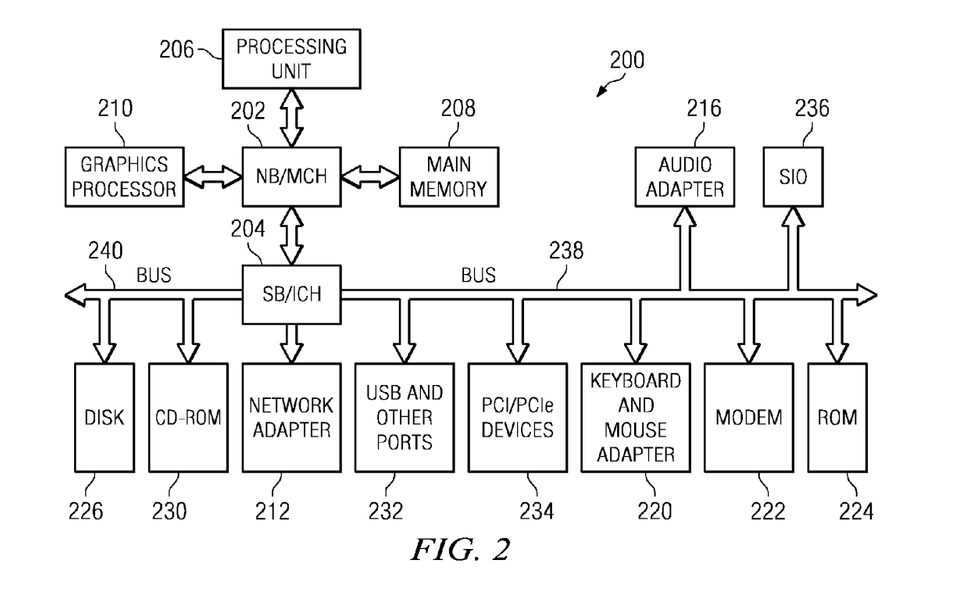
FIG. 2 depicts a block diagram of an exemplary data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as exemplary environments in which exemplary aspects of the illustrative embodiments may be implemented. While the description following FIGS. 1 and 2 will focus primarily on a single data processing device implementation of a mechanism that exploits the allocations of power, cooling, or the like, of one slot in a chassis and shares those allocations with an adjacent slot in the chassis, this is only exemplary and is not intended to state or imply any limitation with regard to the features of the present invention. To the contrary, the illustrative embodiments are intended to include distributed data processing environments and embodiments in which power and cooling may be allocated from one slot in a chassis and with an adjacent slot in the chassis.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
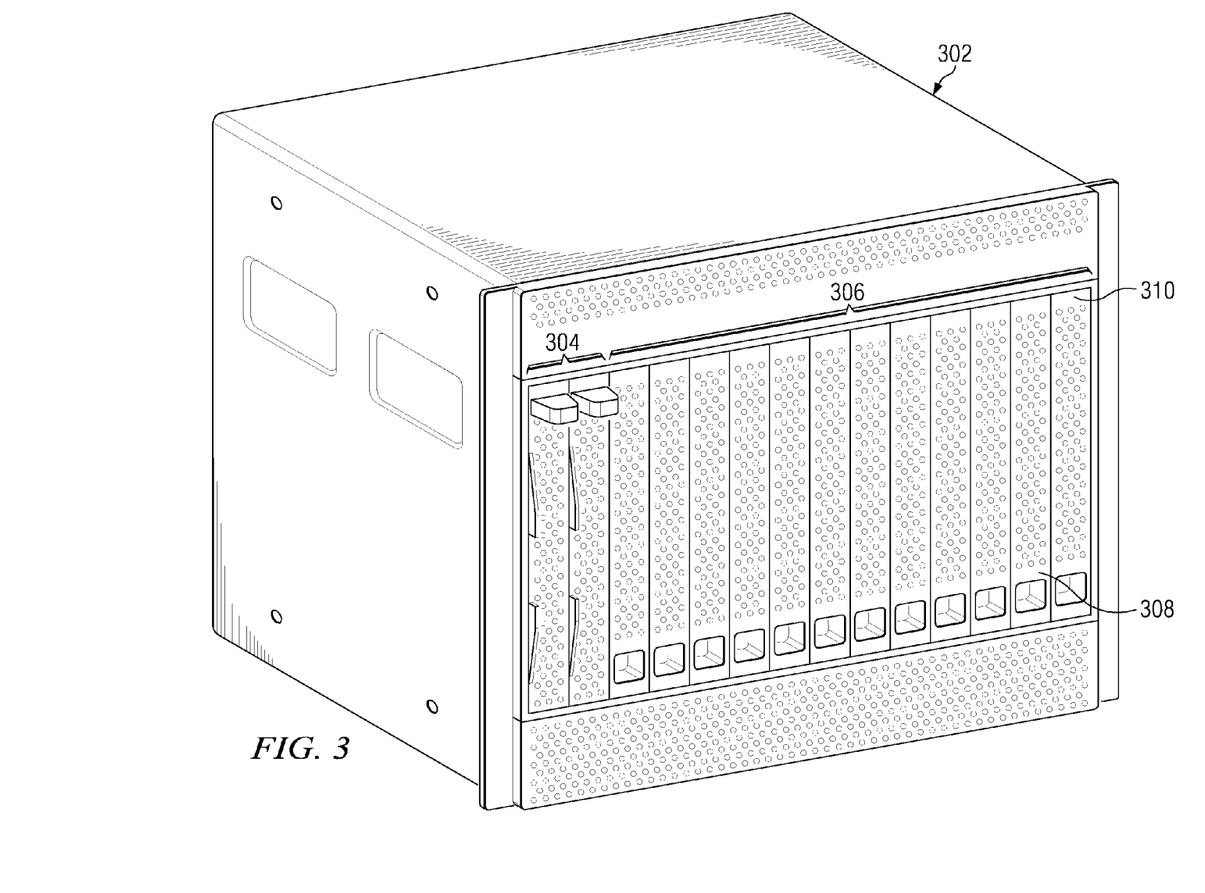
FIG. 3 depicts an exemplary chassis in which an expansion card that shares resource allocations may be used in accordance with an illustrative embodiment.

FIG. 3 depicts an exemplary chassis in which an expansion card that shares resource allocations may be used in accordance with an illustrative embodiment. Chassis 302 may be a chassis, such as a blade center, card chassis, or the like, that contains one or more processor cards 304 and one or more expansion cards 306 which may be for memory, storage, input/output (I/O), switch, or the like, in the form of blades, cards, drives, or the like. Chassis 302 may be a newer version chassis that will accept both current ones of expansion cards 306 as well as intended use card 308, which may be an earlier version card similar to expansion cards 306. However, intended use card 308 may not meet resource allocation specifications of chassis 302. In order for intended use card 308 to operate in chassis 302, the illustrative embodiments provide expansion card 310.

Figure 5A:
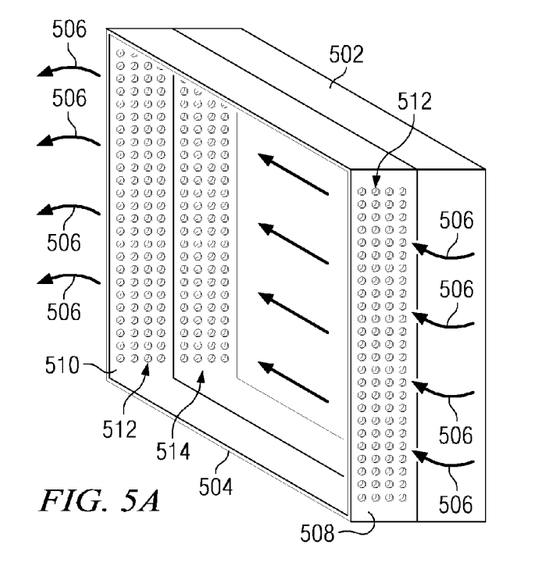
FIGS. 5A and 5B depict an example of how thermal allocations may be provided to an intended use card in accordance with an illustrative embodiment.
Figure 5B:
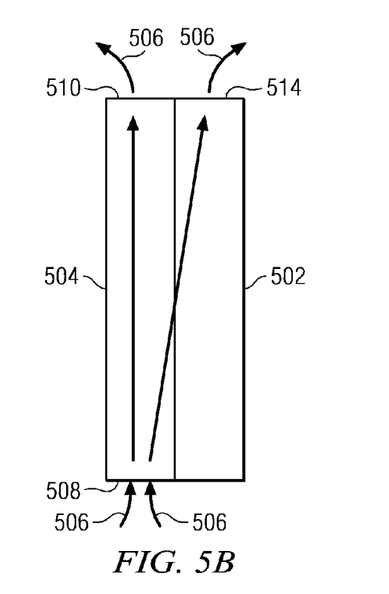

Expansion card 310 is intended to operate in numerous ways. In one illustrative embodiment, expansion card 310 couples to chassis 302 and firmware within chassis 302 interrogates an identifier data structure within expansion card 310 to identify the card type. Using the firmware, chassis 302 recognizes expansion card 310 by its identifier to be a resource sharing expansion card. Once the firmware within chassis 302 identifies expansion card 310, the firmware within chassis 302 may then identify intended use card 308 as being a card that requires the additional resource allocations, such as power, cooling, or the like, from expansion card 310. The firmware within chassis 302 may then internally route resources, such as power from the slot in which expansion card 310 resides to the slot where intended use card 308 resides. Generally expansion card 310 would be placed adjacent to intended use card 308; however, the illustrative embodiment recognizes that if resources are routed internally through chassis 302, expansion card 310 may be plugged into any slot within chassis 302. The firmware within chassis 302 may also allocate other resources, such as cooling, to intended use card 308 by recognizing that expansion card 310 requires no cooling and logically allocating the cooling resource allocation to intended use card 308 as described in FIG. 5.

In an alternative illustrative embodiment, expansion card 310 may be physically connected to intended use card 308. The firmware within chassis 302 would again recognize expansion card 310 by its identifier to be resource sharing expansion card. However, in this illustrative embodiment, expansion card 310 may actually draw its allocation of resources from chassis 302 and feed the resource directly to intended use card 308 via a physical connection, such as through a connection such as Ethernet, InfiniBand®, or the like. As in the previous embodiment, firmware within chassis 302 may also allocate other resources, such as cooling, to intended use card 308 by recognizing that expansion card 310 requires no cooling and logically allocating the cooling resource allocation to intended use card 308 as described in FIG. 5.

Figure 4:
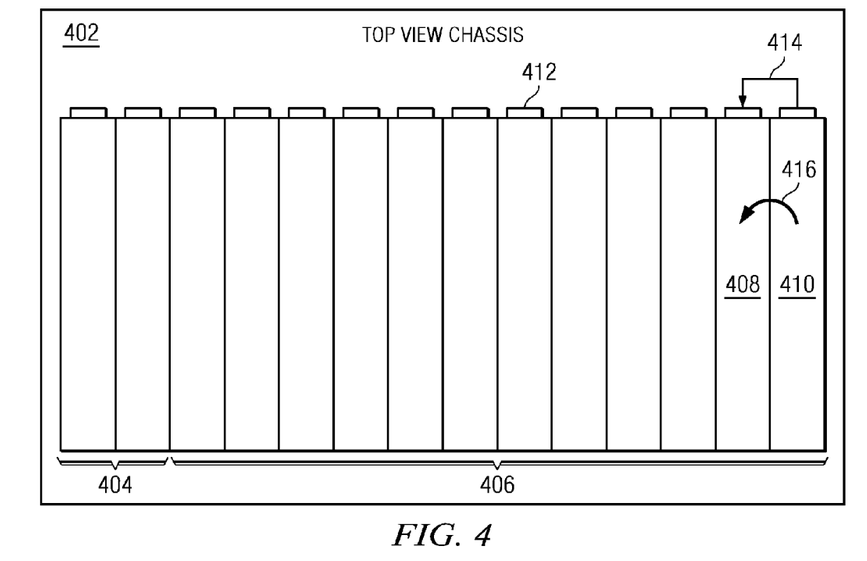
FIG. 4 depicts a top view of a chassis, such as chassis 302 in FIG. 3, in which an expansion card that shares resource allocations may be used in accordance with an illustrative embodiment.

FIG. 4 depicts a top view of a chassis, such as chassis 302 in FIG. 3, in which an expansion card that shares resource allocations may be used in accordance with an illustrative embodiment. As with the example in FIG. 3, chassis 402 may include processor cards 404, expansion cards 406, intended use card 408, and expansion card 410, which may be coupled to chassis 402 through card connectors 412. As with the previous example, intended use card 408 may be one of expansion cards 406 that may not meet resource allocation specifications of chassis 402. In order for intended use card 408 to operate in chassis 402, the illustrative embodiments provide expansion card 410.

In keeping with the first illustrative embodiment, expansion card 410 couples to chassis 402 via one of card connectors 412 and firmware within chassis 402 interrogates an identifier data structure within expansion card 410 to identify the card type. Using the firmware, chassis 402 recognizes expansion card 410 by its identifier to be a resource sharing expansion card. Once the firmware within chassis 402 identifies expansion card 410, the firmware within chassis 402 may then identify intended use card 408 as being a card that requires the additional resource allocations of expansion card 410. The firmware within chassis 402 may then internally route the additional resources from the slot in which expansion card 410 resides to the slot in which intended use card 408 resides, which is shown illustratively as logical connection 414.

In keeping with the second illustrative embodiment, expansion card 410 may be physically connected to intended use card 408 via physical connection 416. The firmware within chassis 402 may again recognize expansion card 410 by its identifier to be resource sharing expansion card. However, in this illustrative embodiment, expansion card 410 may actually draw its allocated resource directly from chassis 402 and feed the resources to intended use card 408 via physical connection 416.

FIGS. 5A and 5B depict an example of how thermal allocations may be provided to an intended use card in accordance with an illustrative embodiment. In this example, expansion card 502 is plugged into a slot of a chassis, which illustratively is adjacent to intended use card 504. Intended use card 504 receives cooling by air 506 entering front panel 508 that passes over the components within intended use card 504 and leaves intended use card 504 through rear panel 510. Both front panel 508 and rear panel 510 provide vents 512 through which air 506 enters and leaves intended use card 504. In order to provide additional cooling of intended use card 504, expansion card 502 provides additional vents 512 only in rear panel 514. With both of the sides of intended use card 504 and expansion card 502 being open, more of air 506 flows in through front panel 508 and leaves through rear panels 510 and 514. Therefore, the firmware within the chassis may recognize the presence of expansion card 502 and allocate the cooling resource allocation of expansion card 502 to intended use card 504.

Figure 6:
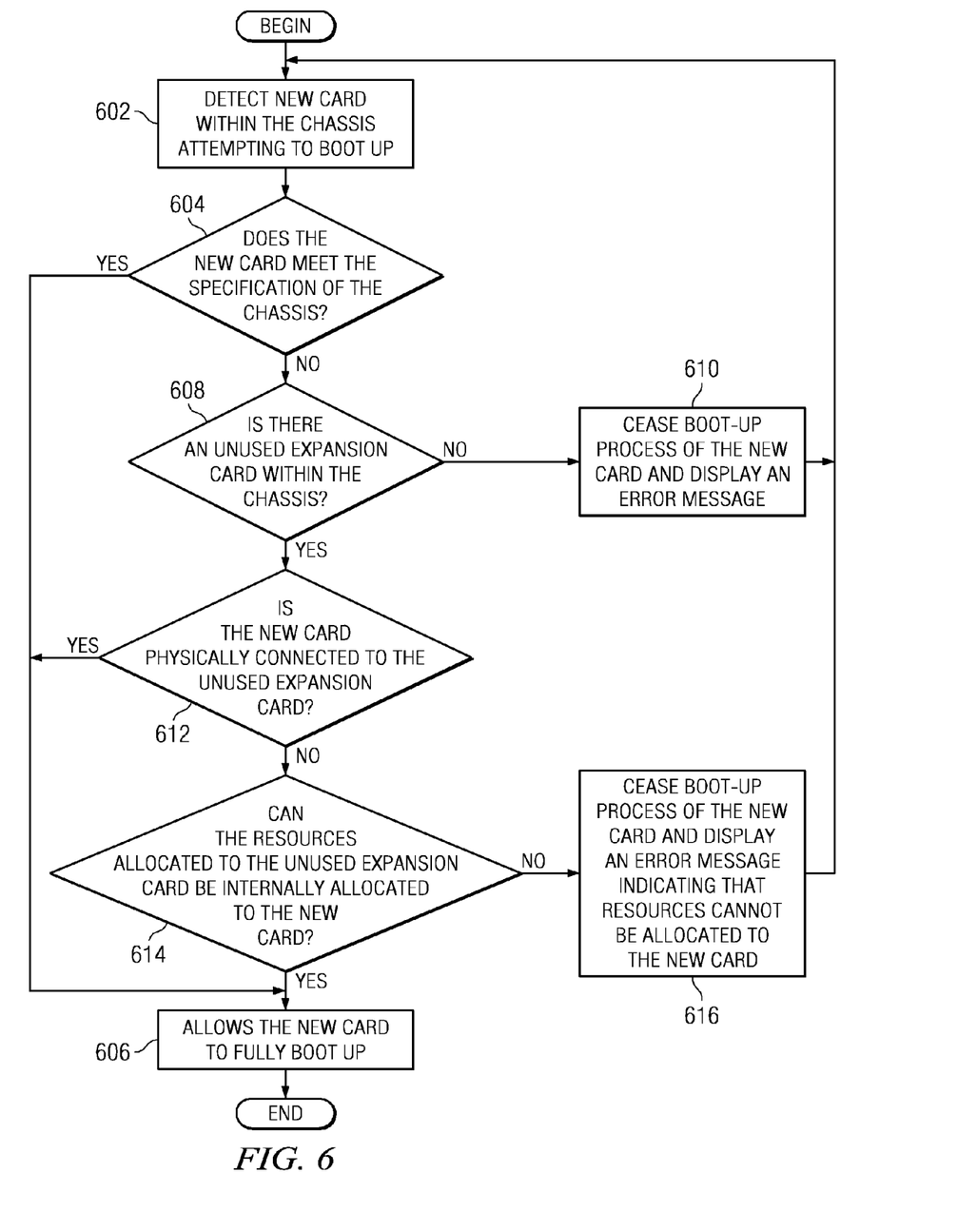
FIG. 6 is a flowchart outlining an exemplary operation for utilizing a resource sharing expansion card within a chassis in accordance with an illustrative embodiment.

FIG. 6 is a flowchart outlining an exemplary operation for utilizing a resource sharing expansion card within a chassis according to the illustrative embodiments. As the operation begins, firmware within a chassis detects a new card within the chassis attempting to boot up (step 602). The firmware interrogates the new card in order to determine whether the new card meets the specifications of the chassis (step 604). If at step 604 the specifications of the new card meet the specifications of the chassis, then the firmware allows the new card to fully boot up (step 606), with the operation ending thereafter.

If at step 604 the specifications of the new card do not meet the specification of the chassis, then the firmware within the chassis determines if there is an unused resource sharing expansion card that shares resource allocations within the chassis (step 608). The resource sharing expansion card may be identified by the firmware interrogating an identifier data structure within the resource sharing expansion card. If at step 608 there is not an unused resource sharing expansion card within the chassis, then the firmware ceases the boot-up process of the new card and displays an error message (step 610). The error message may indicate that the new card cannot boot up because the new card does not meet with the specifications of the chassis, a message that indicates that the new card may be used in the chassis if a resource sharing expansion card is also added, and/or a message that includes a part number for the resource sharing expansion card, with the operation returning to step 602 thereafter.

If at step 608 there is an unused resource sharing expansion card within the chassis, the firmware then determines if the new card is physically connected to the unused resource sharing expansion card (step 612). If at step 612 the new card is physically connected to the unused resource sharing expansion card, then the operation proceeds to step 606. If at step 612 the new card is not physically connected to the unused resource sharing expansion card, then the firmware within the chassis determines if the resources allocated to the unused resource sharing expansion card can be logically allocated to the new card (step 614). If at step 614 the resources allocated to the unused resource sharing expansion card can be logically allocated to the new card, then the operation proceeds to step 606. If at step 614 resources allocated to the unused expansion card cannot be internally allocated to the new card, then the firmware ceases the boot-up process of the new card and displays an error message indicating that the resources cannot be allocated to the new card (step 616), with the operation returning to step 602 thereafter.

Thus, the illustrative embodiments provide mechanisms for exploiting the resource allocations, such as power, cooling, or the like, of one slot in a chassis with another slot in the chassis. By placing the expansion card within an empty slot of the chassis, the intended use card may effectively double the resource allocations of the intended card. Firmware within the chassis may determine what kind of intended use card is plugged into and refuse to boot the intended use card if it is an older one without proper power/cooling. The same firmware detects the expansion card and then accepts the intended use card using the resource allocations of the expansion card.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for sharing resource allocations between cards, the method comprising:
   detecting an insertion of a card within a chassis;
   determining if the card meets resource specifications of the chassis;
   responsive to the card failing to meet the resource specifications of the chassis, determining if an unused resource sharing expansion card exists within the chassis;
   responsive to a presence of the unused resource sharing expansion card, determining if the card is physically connected through a physical connection to the unused resource sharing expansion card;
   responsive to the card being physically connected to the unused resource sharing expansion card, reallocating, internally through the data processing system, one or more resources allocated to the unused resource sharing expansion card to the card; and
   allowing the card to fully boot up.

2. The method of claim 1, further comprising:
   responsive to an absence of the unused resource sharing expansion card, ceasing a boot up of the card; and
   displaying an error message, wherein the error message includes at least one of a first message that indicates that the card cannot boot up because the card does not meet with the resource specifications of the chassis, a second message that indicates that the card may be used in the chassis if the unused resource sharing expansion card is also added, or a third message that includes a part number for the unused resource sharing expansion card.

3. The method of claim 1, further comprising:
   responsive to the card meeting the resource specifications of the chassis, allowing the card to fully boot up.

4. The method of claim 1, further comprising:
   responsive to the card failing to be physically connected to the unused resource sharing expansion card, determining if the one or more resources allocated to the unused resource sharing expansion card can be logically routed to the card; and
   responsive to a determination that the one or more resources allocated to the unused resource sharing expansion card can be logically routed to the card, routing the one or more resources to the card; and
   allowing the card to fully boot up.

5. The method of claim 4, further comprising:
   responsive to a determination that the one or more resources allocated to the unused resource sharing expansion card cannot be logically routed to the card, displaying an error message, wherein the error message indicates that the one or more resources cannot be allocated to the card.

6. A computer program product comprising a non-transitory computer readable storage medium having a computer readable program recorded thereon, wherein the computer readable program, when executed on a computing device, causes the computing device to:

detect an insertion of a card within a chassis;

determine if the card meets resource specifications of the chassis;

responsive to the card failing to meet the resource specifications of the chassis, determine if an unused resource sharing expansion card exists within the chassis;

responsive to a presence of the unused resource sharing expansion card, determine if the card is physically connected through a physical connection to the unused resource sharing expansion card;

responsive to the card being physically connected to the unused resource sharing expansion card, reallocate, internally through the computing device, one or more resources allocated to the unused resource sharing expansion card to the card; and     allow the card to fully boot up.

7. The computer program product of claim 6, wherein the computer readable program further causes the computing device to:

responsive to an absence of the unused resource sharing expansion card, cease a boot up of the card; and     display an error message, wherein the error message includes at least one of a first message that indicates that the card cannot boot up because the card does not meet with the resource specifications of the chassis, a second message that indicates that the card may be used in the chassis if the unused resource sharing expansion card is also added, or a third message that includes a part number for the unused resource sharing expansion card.

8. The computer program product of claim 6, wherein the computer readable program further causes the computing device to:

responsive to the card meeting the resource specifications of the chassis, allow the card to fully boot up.

9. The computer program product of claim 6, wherein the computer readable program further causes the computing device to:

responsive to the card failing to be physically connected to the unused resource sharing expansion card, determining if the one or more resources allocated to the unused resource sharing expansion card can be logically routed to the card; and     responsive to a determination that the one or more resources allocated to the unused resource sharing expansion card can be logically routed to the card, routing the one or more resources to the card; and     allowing the card to fully boot up.

10. The computer program product of claim 9, wherein the computer readable program further causes the computing device to:

responsive to a determination that the one or more resources allocated to the unused resource sharing expansion card cannot be logically routed to the card, display an error message, wherein the error message indicates that the one or more resources cannot be allocated to the card.

11. An apparatus, comprising:

a processor; and a memory coupled to the processor, wherein the memory comprises instructions which, when executed by the processor, cause the processor to:

detect an insertion of a card within a chassis;

determine if the card meets resource specifications of the chassis;

responsive to the card failing to meet the resource specifications of the chassis, determine if an unused resource sharing expansion card exists within the chassis;

responsive to a presence of the unused resource sharing expansion card, determine if the card is physically connected through a physical connection to the unused resource sharing expansion card;

responsive to the card being physically connected to the unused resource sharing expansion card, reallocate, internally through the apparatus, one or more resources allocated to the unused resource sharing expansion card to the card; and     allow the card to fully boot up.

12. The apparatus of claim 11, wherein the instructions further cause the processor to:

responsive to an absence of the unused resource sharing expansion card, cease a boot up of the card; and     display an error message, wherein the error message includes at least one of a first message that indicates that the card cannot boot up because the card does not meet with the resource specifications of the chassis, a second message that indicates that the card may be used in the chassis if the unused resource sharing expansion card is also added, or a third message that includes a part number for the unused resource sharing expansion card.

13. The apparatus of claim 11, wherein the instructions further cause the processor to:

responsive to the card meeting the resource specifications of the chassis, allow the card to fully boot up.

14. The apparatus of claim 11, wherein the instructions further cause the processor to:

responsive to the card failing to be physically connected to the unused resource sharing expansion card, determining if the one or more resources allocated to the unused resource sharing expansion card can be logically routed to the card; and     responsive to a determination that the one or more resources allocated to the unused resource sharing expansion card can be logically routed to the card, routing the one or more resources to the card; and     allowing the card to fully boot up.

15. The apparatus of claim 14, wherein the instructions further cause the processor to:

responsive to a determination that the one or more resources allocated to the unused resource sharing expansion card cannot be logically routed to the card, display an error message, wherein the error message indicates that the one or more resources cannot be allocated to the card.

\* \* \* \* \*